United States Patent [19]

McLennan

[11] E Re. 29,162

[45] Reissued Mar. 29, 1977

[54] ABUTMENT SWIVEL DOORSTOP

[76] Inventor: Lyall A. McLennan, 2896 Trinity St., Vancouver 6, British Columbia, Canada

[22] Filed: Oct. 23, 1975

[21] Appl. No.: 625,016

Related U.S. Patent Documents

Reissue of:

[64] Patent No.: 3,861,726
Issued: Jan. 21, 1975
Appl. No.: 345,061
Filed: Mar. 26, 1973

[52] U.S. Cl. ..... 292/67; 292/205; 292/207; 292/290; 292/298; 292/DIG. 19

[51] Int. Cl.[2] ..... E05C 5/00

[58] Field of Search ..... 292/65, 67, 202, 205, 292/207, 208, 290, 297, 298, DIG. 9, DIG. 19; 16/82, 85

[56] References Cited

UNITED STATES PATENTS

| | | | |
|---|---|---|---|
| 595,425 | 12/1897 | Adams | 292/205 |
| 893,463 | 7/1908 | Denny | 292/67 X |
| 1,516,673 | 11/1924 | Hanisko | 292/202 |
| 2,513,070 | 6/1950 | Weissinger | 292/205 X |

FOREIGN PATENTS OR APPLICATIONS

| | | | |
|---|---|---|---|
| 1,210 | 1/1906 | United Kingdom | 292/67 |
| 368,540 | 3/1932 | United Kingdom | 292/67 |
| 1,214,834 | 12/1970 | United Kingdom | 292/288 |

*Primary Examiner*—Robert L. Wolfe
*Attorney, Agent, or Firm*—Robert W. Beach

[57] ABSTRACT

A swivel bar is mounted on a door jamb to swing between a position in the path of the door to block its opening and a position retracted out of the path of door-opening movement. The stop bar can be held in door-blocking position by engagement of a rib-and-groove latch. The stop bar can be moved into latch-engaged position by swinging of a keeper to move co-operating cylindrical or edgewise cams relatively which movement shifts the stop bar into latched position in opposition to the force of a latch-releasing spring.

14 Claims, 19 Drawing Figures

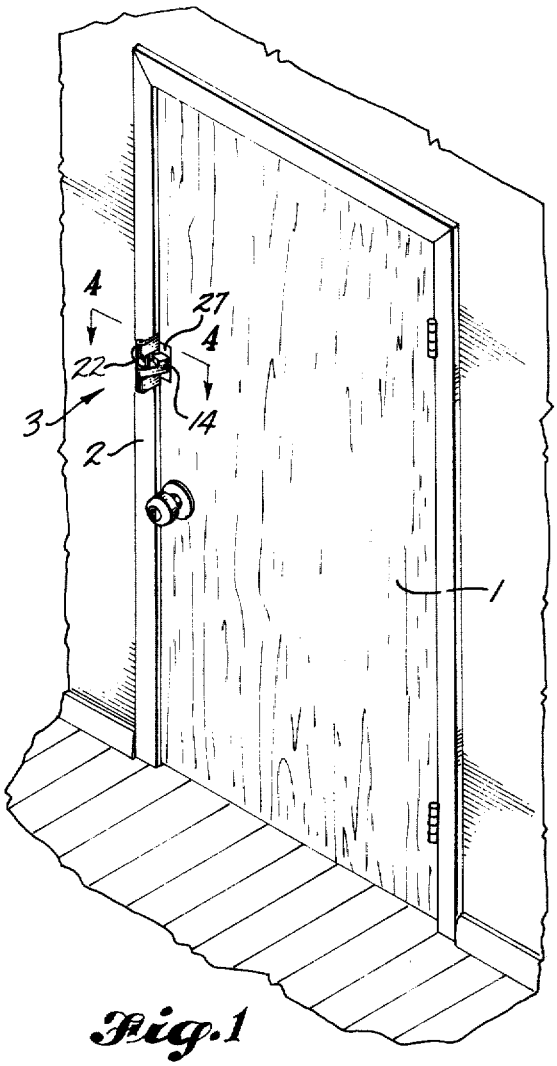
Fig. 1
Fig. 2
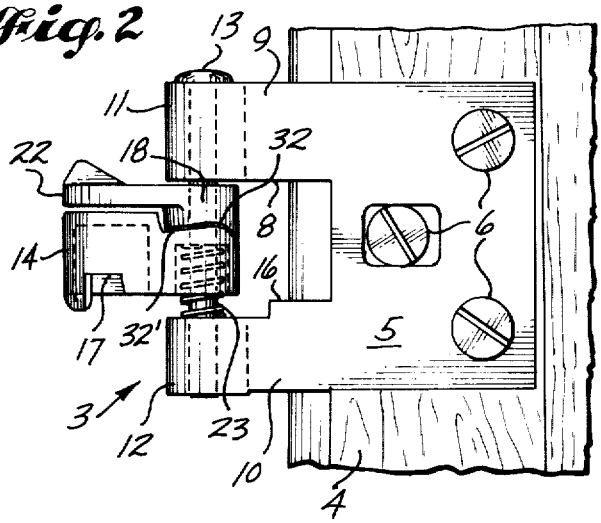
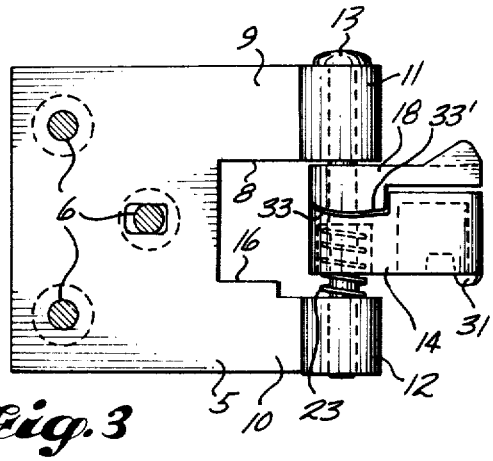
Fig. 3
Fig. 4
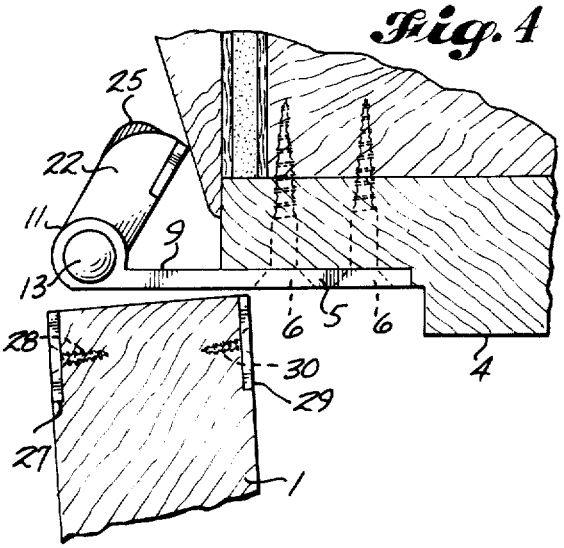
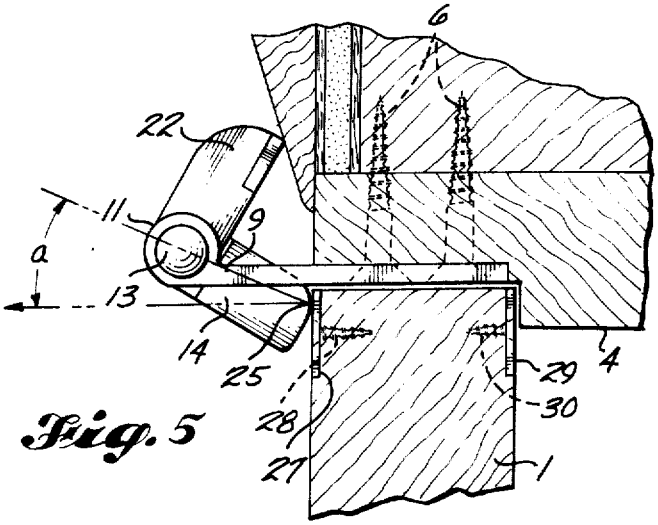
Fig. 5

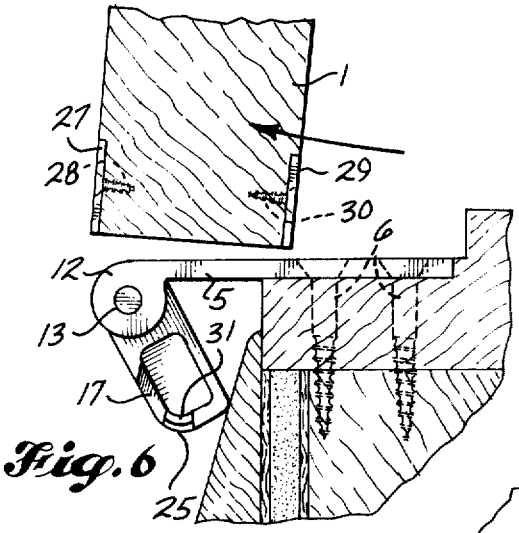
Fig. 6
Fig. 7
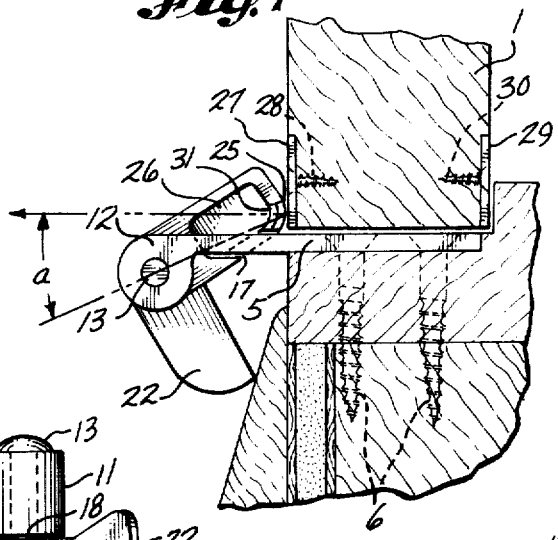
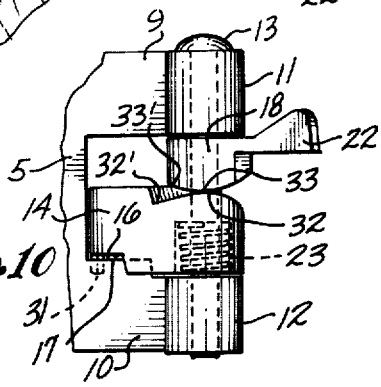
Fig. 10
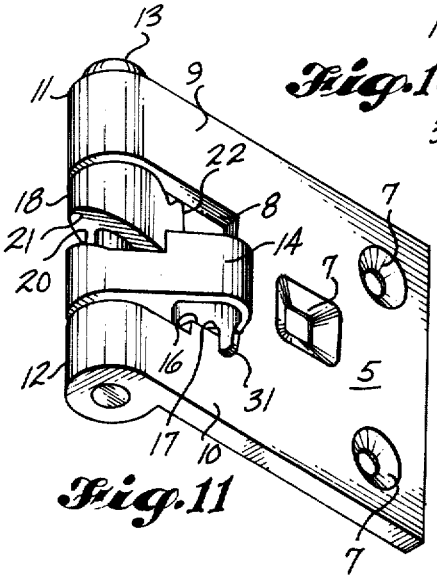
Fig. 11
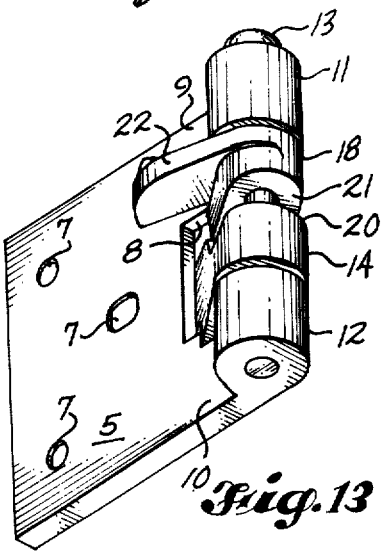
Fig. 13
Fig. 8
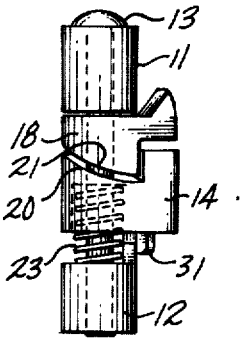
Fig. 12
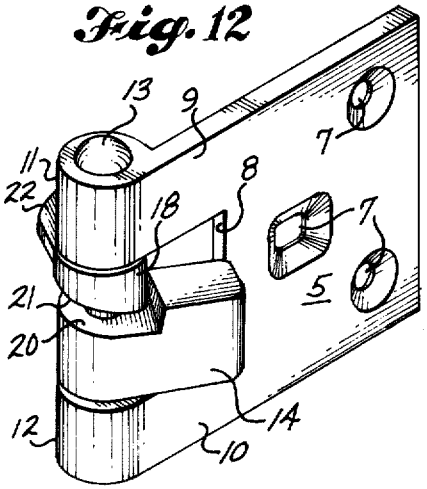
Fig. 9
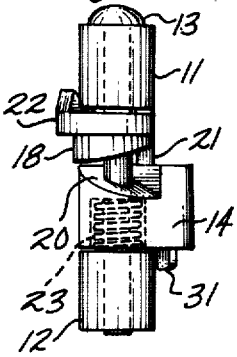
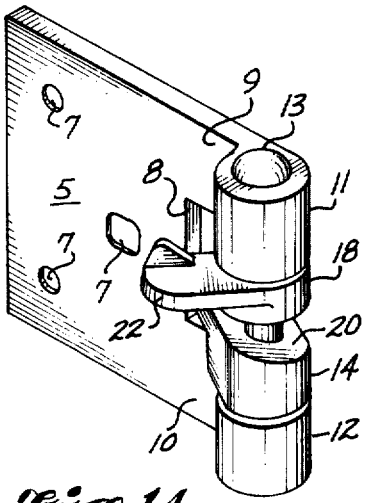
Fig. 14

ABUTMENT SWIVEL DOORSTOP

Matter enclosed in heavy brackets [ ] appears in the original patent but forms no part of this reissue specification; matter printed in italics indicates the additions made by reissue.

*BACKGROUND OF THE INVENTION*

*Field of the Invention*

This application relates to stops for preventing the opening of doors and is particularly advantageous for use with swinging doors.

*Prior Art*

*Few proposals for door latches along the lines of the present door latch have been proposed. A comparatively complicated doorkeeper is disclosed in U.S. Pat. 2,513,070. Proposed fasteners or limit stops are shown in British specification 368,540 and in British specification 1,214,834. While the latter door fastener provides a thrust member for abutment by the door, such thrust member is supported and operates in a manner quite different from the doorstop of the present invention.*

*SUMMARY OF THE INVENTION*

A principal object of the present invention is to provide a stop which can be moved into door-blocking position quickly and easily.

A further object is to provide such a doorstop which is small, compact and unobtrusive yet which is strong for its size.

Another object is to provide such a doorstop which is effective and reliable to prevent the opening of a door and which can be released from only one side of the door. Moreover, the stop can be locked so that it cannot be opened by an unauthorized person even from the side of the door where the stop is accessible.

It is also an object to provide a stop construction which is simple and has few parts, which is durable, cannot jam or otherwise readily become inoperative, yet which is economical to manufacture.

Still a further object is to provide such a doorstop which can be installed easily and quickly by an unskilled person.

*The foregoing objects can be accomplished by a stop mechanism having a stop member turnable about a stop member turning axis parallel to the axis about which a closure swings so that the stop member can swing between a closure-clearing position out of the opening movement path of the closure and a closure-blocking position in the path of closure movement. The stop member turning axis is located so that the stop member turning axis is substantially perpendicular to and offset slightly from the opening movement path of the closure and is located so that a line joining the stop member turning axis and a closure-engageable portion of the stop member in closure-blocking position is at an angle of less than 45° to the opening movement path of the stop-engageable portion of the closure. Latch means are engageable between the mount and the stop member for preventing swinging of the stop member out of closure-blocking position relative to the mount.*

*BRIEF DESCRIPTION OF THE DRAWINGS*

FIG. 1 is a top perspective of a representative door showing a typical installation of a stop of the present invention.

FIGS. 2 and 3 are side elevations of the stop mechanism viewed from opposite sides showing the door-engageable stop member in door-clearing position.

FIGS. 4 and 5 are plans of the stop mechanism, FIG. 4 illustrating the door-engageable stop member in fully retracted door-clearing position and FIG. 5 illustrating such member in door-blocking latched position.

FIGS. 6 and 7 are bottom plans of the stop mechanism, FIG. 6 showing the stop member in fully retracted door-clearing position and FIG. 7 showing the stop member latched in door-blocking position.

FIGS. 8 and 9 are edge elevations of the stop mechanism, FIG. 8 showing the stop member in door-blocking unlatched position and FIG. 9 showing the stop member in door-blocking latched position.

FIG. 10 is a fragmentary side elevation as viewed from the left of FIG. 9.

FIGS. 11 and 12 are bottom and top perspectives, respectively, of one side, and FIGS. 13 and 14 are bottom and top perspectives, respectively, of the other side of the stop mechanism, the stop member in each instance being in door-blocking latched position.

*DETAILED DESCRIPTION*

The doorstop of the present invention is most suitable for blocking opening of a closure such as a door 1 mounted in a frame 2 to swing into a building or living space, but the structure could be used for blocking opening of a closure such as a sliding door or window. The important feature in each instance is that the stop mechanism includes a closure-engageable stop member that can be moved between a closure-clearing position out of the path of opening movement of the closure and a closure-blocking position in the path of movement of the portion of the closure engageable by the stop member so as to prevent appreciable opening movement of the closure.

Figure 15:
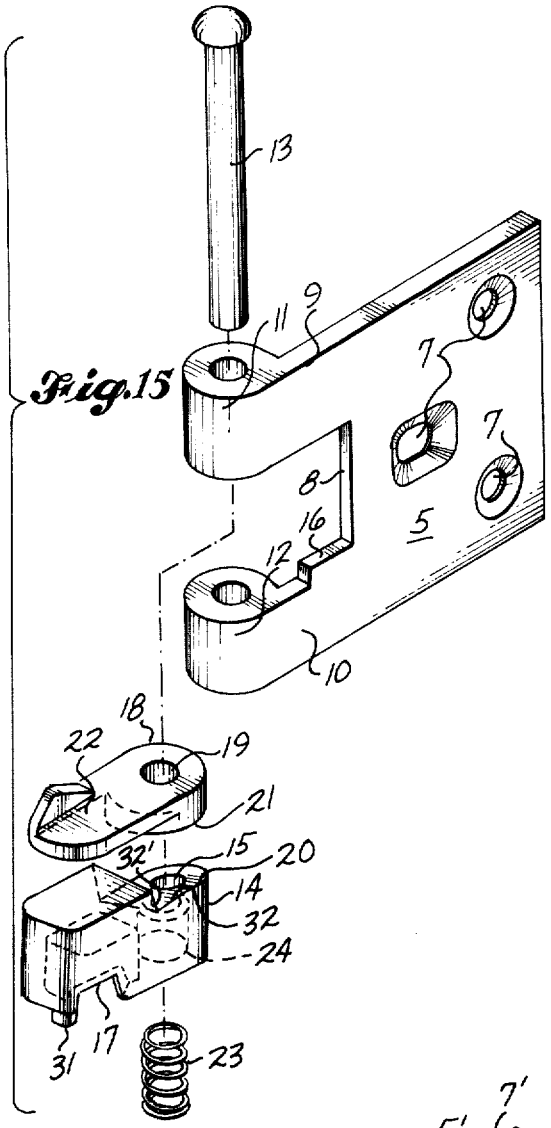
FIGS. 15 and 16 are exploded top and bottom perspectives, respectively, of the stop mechanism viewed from the same side.
Figure 16:
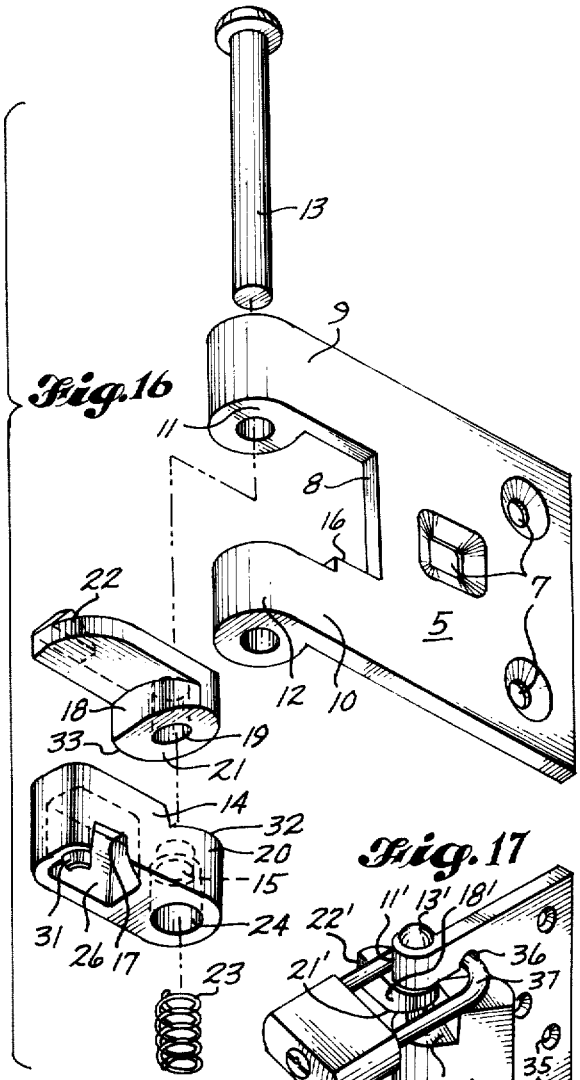

The doorstop mechanism designated generally by the numeral 3 can be attached to the jamb 4 of a doorway, as shown in FIGS. 2 and 3, by securing the mount 5 of such mechanism to the doorjamb by screws 6. Such screws extend through holes 7, preferably three or more as shown in FIG. 15, for example, in the plate portion of the stop mechanism, which plate constitutes the mount 5. Normally such mounting plate portion will be mortised flush into the jamb as shown in FIGS. 4 to 7 inclusive. If desired the stop mechanism could be mounted on the lintel.

From the mounting plate portion 5 an upper ear 9 and a lower ear 10 project in spaced, parallel, coplanar relationship defining an opening 8 therebetween. On the free ends of ears 9 and 10 are bosses 11 and 12, respectively, preferably of cylindrical cross-section. A bore through the upper boss 11 and a bore through the lower boss 12 are aligned to receive through them a pintle 13 for mounting swingable stop and keeper members. When stop mechanism 3 is mounted on a doorjamb, the pintle axis is parallel to the door hinge axis. The stop member 14 is a thrust or compression member in the form of a bar having an aperture 15 extending through one end portion, through which aperture the pintle passes, as shown in FIGS. 2, 3, 8, 9, 14 and 15 in particular, so that it can be swung about the pintle axis between closure-clearing and closure-blocking positions. The pintle axis is located a substantial distance from the portion of the stop member engageable by the closure, and is offset slightly from the path of opening movement of the stop-engageable portion of the closure. A line joining the closure-engageable portion of the stop member in a closure-blocking position and the pintle axis is at a small acute angle, such as 20° to 25°, to the path of movement travelled by the stop-engageable portion of the closure toward open position, which angle is designated *a* in FIGS. 5 and 7. By making the angle *a* small the stop mechanism can resist a greater pressure exerted on it by the closure. Since the angle *a* is less than 45°, the pressure of the closure will exert on the stop member 14 a compressive force toward the pintle 13 greater than the stop member swinging force acting perpendicular to a line joining the pintle axis and the stop-engageable portion of the closure. Also the mount is mounted on the closure frame so that the pintle axis is located farther from the face of the frame than it is to the closure when the closure is in its position closest to the pintle axis.

While the stop member 14 can be swung from the closure-clearing position of FIGS. 4 and 6 to the closure-blocking position of FIGS. 5 and 7 about the axis stop member turning of pintle 13, it is desirable to hold the stop member positively in the closure-blocking position. Such holding action can be accomplished by providing latch means for preventing the stop member from swinging relative to the mount 5 and ears 9 and 10. Such latch means includes a projection 16 in the form of a shoulder formed on the inner edge of the ear 10 in the window 8 and located between the mounting plate portion 5 and the boss on ear 10. A socket in the form of a groove 17 in the bottom of the stop member is of a size to embrace the projection 16 reasonably snugly to prevent appreciable swinging of the stop member relative to the ear 10 when such groove is fitted over the projection.

In order to slide stop member 14 along pintle 13 to engage groove 17 with projection 16, a keeper 18 is provided between the stop member 14 and the ear 9. The keeper has in it a bore 19 through which the pintle 13 extends so that the keeper can turn relative to the stop mechanism mount 5 and its ears 9 and 10. Cam 20 on the stop member and cam 21 on the keeper have adjacent coacting surfaces constituting wedging edgewise or cylinder cams so that relative rotation of the stop member 14 and the keeper 18 between the position shown in FIG. 8 and that of FIG. 9 will spread these members apart.

To facilitate turning of the keeper 18, a handle 22 projecting radially from it is provided. Conveniently such handle includes an upwardly projecting finger-engageable tab. The stop member 14 is pressed toward the keeper 18 by a helical compression spring 23 circling the pintle 13. One end of the spring is engaged with the adjacent inner side of boss 12 and its other end portion is fitted in a counterbore 24 of the aperture 15 through which the pintle 13 passes. When the groove 17 is engaged with the projection 16, the end portion 25 of the keeper bar 14 will be closest to the door 1 and, in fact, next to the closed door. A lightening cavity 26 is provided in the stop bar.

To prevent the door 1 being marred by its face striking or being pressed against the blocking surface 25 of the stop member 14, a faceplate 27 can be mounted on the face of the door at the location engageable by the stop member surface 25. Such faceplate 27 is secured to the door face by one or more screws 28, as shown in FIGS. 4 to 7 inclusive, and preferably such faceplate is recessed by being mortised flush with the adjacent surface of the door as also shown in those figures. To prevent the opposite side of the door from being marred by the door being closed when the keeper member is inadvertently left or placed in door-blocking position, a second faceplate 29 can be mounted by a screw or screws 30 on the opposite face of the door. Again it is preferred that the faceplate 29 be recessed into the door face, such as by being mortised flush with the door face, as also shown in FIGS. 4 to 7 inclusive. Lug 31 projecting below the lower edge of the side of stop member 14 opposite groove 17 is engageable with projection 16 to limit the swung position of such stop member, as shown in FIGS. 7 and 8.

In the manner described below, the stop member 14 and keeper 18 can occupy three principal positions namely, closure-clearing position, unlatched closure-blocking position and latched closure-blocking position. The closure-clearing position is illustrated in FIGS. 4 and 6 in which handle 22 of keeper 18 and stop member 14 are in registration. These members can be swung conjointly through an intermediate position shown in FIGS. 2 and 3 into the unlatched closure-blocking position shown in FIG. 8. The handle 22 can be swung relative to stop member 14 through the intermediate position of FIGS. 9 and 10 into the position shown in FIGS. 5, 7 and 11 through 14 to latch the stop member in closure-blocking position.

While the stop mechanism can be mounted with either edge up depending on which direction the door 1 swings relative to the frame 2, it is preferred that the stop mechanism be mounted so that the keeper 18 is above the stop bar 14 as shown in FIGS. 2, 3, and 8 to 13. When the handle 22 of keeper 18 is in registration with the stop bar 14, as shown in FIGS. 2, 3 and 8, irrespective of the swung positions of these two members relative to the mount 5 and ears 9 and 10, the edgewise cam surfaces 20 and 21 will be contiguous as shown in these figures and stop bar 14 will be forced as far as possible away from the ear 10 by the spring 23. Such spring presses the stop bar 14 against the keeper 18 and thereby presses the keeper against the boss 11 of the opposite ear 9, as also shown in these figures.

When the stop bar 14 is held by spring 23 in such spaced relationship relative to the boss 12 of ear 10, the grooved portion of the stop bar will clear the projection 16 so that the stop bar and keeper 18 can be conjointly swung freely about the axis of pintle 13 between the closure-clearing limit position shown in FIGS. 4 and 6 and the unlatched closure-blocking limit position shown in FIG. 8. These members cannot swing conjointly farther into the opening 8 because lug 31 will engage the side of the shoulder 16, as shown in FIGS. 7 and 8. These swinging parts are shown in an intermediate position in FIGS. 2 and 3. The pressure of spring 23 will tend to maintain the stop bar 14 and the keeper 18 in registration.

If the stop bar 14 and keeper 18 are swung conjointly into the closure-blocking position shown in FIG. 8 when the door 1 is closed, force can be applied to the handle 22 of keeper 18 to swing it toward the position shown in FIGS. 9 and 10 while the stop bar is held manually in the swung position shown in FIGS. 5, 7, 8, 9, 10, 11 and 12. The wedging coaction of the edgewise cam surfaces 20 and 21 resulting from turning of keeper 18 from the position shown in FIG. 8 to the position shown in FIGS. 9 and 10 relative to the stop bar 14 will spread the stop bar and keeper. Since movement of the keeper 18 axially of pintle 13 is prevented by engagement of such keeper with the boss 11, the spreading of the stop bar and keeper will result in the stop bar being moved toward the ear 10 and its boss 12, as shown in FIG. 9.

By such movement of the stop bar 14 axially of pintle 13, the groove 17 of the stop bar will be pressed over the projection 16 of ear 10 to the position shown best in FIGS. 7 and 11. As soon as the stop bar 14 is thus moved axially sufficiently so that the projection 16 enters at least partially into the groove 17 so as to prevent the stop bar from swinging out of closure-blocking position, such stop bar need no longer be held manually against swinging while turning of keeper 18 is continued by exerting force on handle 22.

Both cam surfaces 20 and 21 are semicircular inclined wedging surfaces. Cam surface 20 on stop bar 14 is upwardly inclined from [ the near edge as seen in FIG. 3 to the opposite edge ] *one side to the other side as* shown in [ FIG. 2 ] *FIGS. 8 and 9*. A crown 32 *shown in FIG. 10* constitutes the highest portion of the cam surface which continues beyond such crown a short distance as a recess 32'. Cam surface 21 on the keeper 18 has an initial recess 33', followed by a downwardly projecting crown 33, as seen in FIG. 3, followed by an upwardly-inclined surface to the end of such cam surface seen in FIG. 2. When the keeper 18 and stop bar 14 are in the aligned oppositely-projecting relationship shown in FIGS. 9 and 10, the crowns 32 and 33 are in engagement as shown in FIG. 10 and the stop bar and keeper have been spread apart to their maximum extent. As keeper 18 is turned farther toward the position of FIGS. 5, 7, 13 and 14, the crowns 32 and 33 move relatively past the dead center established by their mutual engagement, and the spring 23 moves stop member 14 slightly toward keeper 18 and slightly away from boss 12 so that recesses 32' and 33' are engaged. Consequently, reverse relative rotation of the cam is deterred and the keeper tends to be maintained in such position beyond dead center to hold stop member 14 securely latched in the closure-blocking position shown in FIGS. 5, 7 and 11 to 14 for engagement by the face-plate 27 on the door. If an attempt is made to open the door, such engagement will prevent further opening movement of the door and pressure on the door will produce a compression force in stop member 14.

When it is desired to shift the stop bar 14 from the closure-blocking position of FIGS. 5, 7 and 11 to 14 to the closure-clearing position shown in FIGS. 4 and 6, it is necessary first to swing the keeper handle 22 from the position of FIGS. 5, 7 and 11 to 14, fully toward the door through the position of FIGS. 9 and 10 into the position of FIG. 8. While the keeper handle 22 is being swung from the position of FIG. 9 to the position of FIG. 8, the spring 23 will shift the stop bar 14 progressively axially along pintle 13 from the position of FIG. 9 toward the position of FIG. 8.

When the keeper handle 22 has been brought into registration with the stop bar 14 as shown in FIG. 8, such stop bar will have been shifted axially of pintle 13 sufficiently so that groove 17 will clear the projection 16. Next the keeper and stop bar can be swung conjointly in the opposite direction away from the door from the position of FIG. 8 to the closure-clearing position of FIGS. 2 and 3 or even farther to the closure-clearing position of FIGS. 4 and 6. The door 1 can then be opened freely without interference by the stop bar. If the stop bar should be swung into closure-blocking position when the door 1 is opened and the door is swung toward closed position without the stop bar being swung into closure-clearing position the face-plate 29 will strike the side of stop bar 14 opposite its groove 17. While the door cannot be closed as long as the stop bar is in such closure-blocking position, engagement of the face plate 29 with the stop bar will prevent the margin of the outer door face from becoming marred.

A double swinging action is also required to shift the stop bar from the closure-clearing position to the closure-blocking position. The keeper and stop bar are swung conjointly toward the door to the position of FIG. 8 and then the keeper alone is swung away from the door into the position of FIGS. 5, 7 and 11 to 14.

Figure 17:
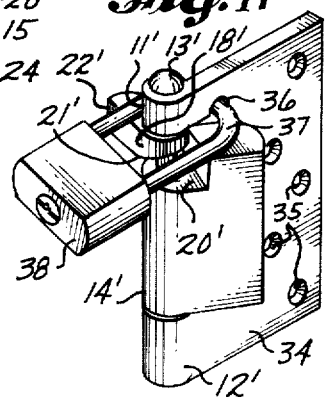
FIG. 17 is a top perspective of a somewhat modified stop mechanism with the stop member locked in door-locking latched position.

Instead of relying on the swiveled keeper alone to maintain the stop bar in closure-blocking position relative to the stop mechanism mount such stop bar can be locked positively in its closure-blocking position if desired. In FIG. 17 a heavy-duty swivel doorstop mechanism is illustrated which has parts corresponding to the parts of the doorstop mechanism described above but which parts are larger and stronger. In this structure the base 34 can be secured to a doorjamb by screws or bolts passing through holes 35. Ears [ 9' and 10' ] project in spaced relationship from the base 34 and have bosses *11' and 12'* which are bored to receive the pintle 13'. Such pintle extends through a bore in the stop bar 14'.

The adjacent portions of the stop bar 14' and a keeper 18' have cooperating edgewise or cylinder cams 20' and 21' which coact during relative turning of the stop bar and keeper to spread these parts. Turning of the keeper 18' relative to the stop bar 14' is effected by swinging handle 22' integral with the keeper. It is not necessary, either in the structure of this stop mechanism or in that described in connection with FIGS. 2 through 16, to provide a spring for urging the stop bar away from the ear 10 or 10' to disengage the latch groove from a latch edge. Instead the stop bar can be shifted manually, axially of the pintle into unlatched position. The spring, however, provides a more convenient operation for shifting the stop bar from closure-blocking to closure-clearing position.

Instead of or in addition to relying on the keeper 18' to hold the stop bar 14' in a position such that its latch groove is in latching engagement with the latch edge, an eye can be provided between the stop bar and the ear 9' into which a spacer member can be inserted to limit movement of the stop bar 14 axially of the pintle 13. In FIG. [ 16 ] *17* the eye is shown as being formed by an arcuate notch 36 in the edge of ear 9' adjacent to the stop bar 14'. The shackle 37 of a padlock 38 is shown as having been inserted through such eye to serve as the spacer member for limiting axial movement of the stop bar 14'. By application of a padlock in this manner, the stop mechanism is held positively in closure-blocking position until the padlock is removed.

Figure 18:
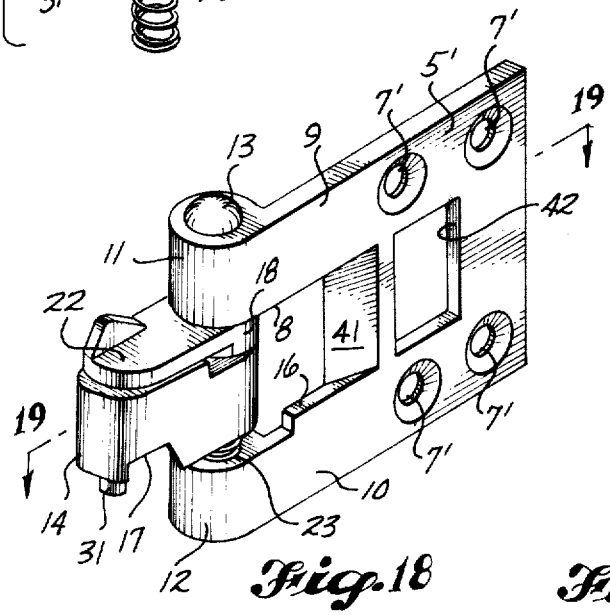
FIG. 18 is a top perspective of another modified type of stop mechanism with the door-engageable stop member in door-clearing position.

In the alternative construction shown in FIGS. 18 and 19 most of the components can be identical with those described in connection with FIGS. 2 to 16 inclusive. In this instance, however, the mount 5' differs from the mount of the stop mechanisms described above in that such mount includes features of a conventional strike for a door lock. Instead of the doorstop mechanism being entirely separate from the door lock, the mount of the stop mechanism is integrated with the strike of the door lock to reduce the amount of hardware and thus installation labor in new construction.

In order to provide a stop bar and keeper of adequate strength, the width of the opening 8 between the ear 9 and the projection 16 is likely to be greater than the width of the bolt 39 of lock 40. Consequently, the edge of the opening 8 parallel to and remote from pintle 13 is inclined to form a ramp 41 along which the end of bolt 39 can slide to wedge the bolt out of the opening 8. At the side of the ramp 41 remote from pintle 13 is another opening 42 into which the end of the bolt 39 can snap as the door is closed to hold the door in the position shown in FIG. 19. The mount 5' is held in proper position on the doorjamb by screws or bolts extending through apertures 7' in the mount. When the stop bar is in a closure-clearing position such as shown in FIG. 18 or FIG. 19, bolt [ 30 ] *39* can pass stop mechanism 3. When the door is closed, the stop bar can be swung between closure-blocking and closure-clearing positions in the manner described above in connection with FIGS. 2 to 16 and will block opening of the door by engagement of faceplate 27 with the stop bar 14 in the same manner as described above.

Figure 19:
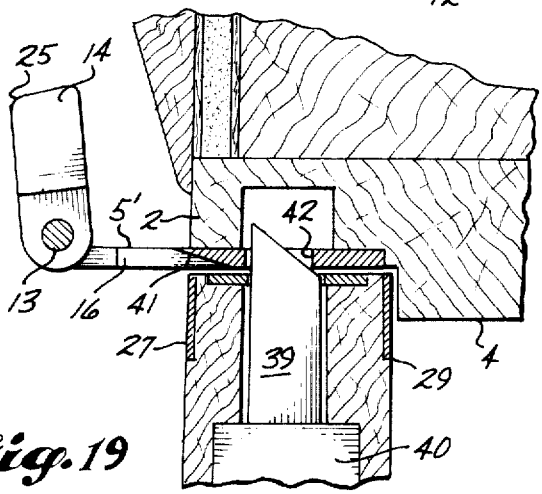
FIG. 19 is a horizontal section through such mechanism taken on line 19—19 of FIG. 18 but with the door-engageable stop member in fully retracted door-clearing position.

If reliance were placed on the lock 40 alone, to secure a door a thin, stiff sheet could be inserted between the edge of the door 1 and the doorjamb 4 from the right side as seen in FIG. 19 and wedge the inclined end of bolt 39 out of the window 42 of the mount 5'. However, with the stop mechanism of the present invention, even if such a sheet were forced on through the space between the door edge and the jamb into engagement with the stop bar 14, such stop bar could not be dislodged because of the latching engagement between its groove 17 and the projection 16. Such engagement is maintained by the keeper 18 being in its position past dead center, as shown in FIGS. 11 to 14, inclusive, or by the interposition of some other type of spacer between the stop bar 14 and the ear 9, such as the shackle of a padlock, as discussed in connection with FIG. 17.

I claim:

1. In abutment stop mechanism for blocking opening movement of a closure *swingable about an upright axis* including a stop member and a mount separate from the closure, mounted adjacent to *the closure in closed position and* [ but ] independently of the closure [ in closed position ] and supporting the stop member for turning about a stop member turning axis between a closure-blocking position *of the stop member obstructing* [ and a closure-clearing position, in which closure-blocking position the stop member obstructs ] a predetermined opening-movement path of a stop-engageable portion of the closure and *a closure-clearing position of the stop member out of the opening-movement path of the closure, in which closure-blocking position of the stop member* a closure-engageable portion of the stop member *located a substantial distance from such stop member turning axis* is engageable by such stop-engageable portion of the closure to limit *its* movement [ of such stop-engageable portion ] along such predetermined opening-movement path, [ and in which closure-clearing position the stop member is out of the opening-movement path of the stop-engageable portion of the closure, the closure-engageable portion of the stop member being located a substantial distance from the stop member turning axis, ] the improvement comprising the mount [ being mounted with ] *mounting* the stop member *for* turning *about an upright stop member turning* axis substantially perpendicular to and offset slightly from such predetermined opening-movement path of the stop-engageable portion of the closure and located so that a line joining such stop member turning axis and the closure-engageable portion of the stop member in closure-blocking position is at an angle *of less than 45°* to such predetermined opening-movement path of the stop-engageable portion of the closure, *whereby* [ of less than 45° so that ] pressure of the stop-engageable portion of the closure on the stop member will exert on the stop member a compressive force toward the stop member turning axis greater than the stop member swinging force acting perpendicular to a line joining the stop member turning axis and the stop-engageable portion of the closure when the closure is in its position closest to the stop member turning axis, *and latch means engageable between the mount and the stop member for preventing swinging of the stop member out of closure-blocking position relative to the mount.*

2. The stop mechanism defined in claim 1, [ and ] *the* latch means for [ securing ] *preventing swinging of* the stop member [ in ] *out of* its closure-blocking position *including* a latch groove in the stop member and a latch projection carried by the mount and located for engagement in said groove when the stop member is in closure-blocking position.

3. In abutment stop mechanism for blocking opening movement of a closure including a stop member and a mount separate from the closure, mounted adjacent to but independently of the closure in closed position and supporting the stop member for turning about a stop member turning axis between a closure-blocking position and a closure-clearing position, in which closure-blocking position the stop member obstructs a predetermined opening-movement path of a stop-engageable portion of the closure and a closure-engageable portion of the stop member is engageable by such stop-engageable portion of the closure to limit movement of such stop-engageable portion along such predetermined opening-movement path, and in which closure-clearing position the stop member is out of the opening-movement path of the stop-engageable portion of the closure, the improvement comprising latch means interengageable between the stop member and the mount for securing the stop member in its closure-blocking position and including a latch groove and a latch projection located for locking interengagement when the stop member is in closure-blocking position, and cam means turnable relative to the mount and the stop member for effecting movement of the stop member axially relative to the mount to engage said latch projection in said latch groove.

4. In abutment stop mechanism for blocking opening movement of a closure including a stop member and a mount separate from the closure, mounted adjacent to but independently of the closure in closed position and supporting the stop member for turning about a stop member turning axis between a closure-blocking position and a closure-clearing position, in which closure-blocking position the stop member obstructs a predetermined opening-movement path of a stop-engageable portion of the closure and a closure-engageable portion of the stop member is engageable by such stop-engageable portion of the closure to limit movement of such stop-engageable portion along such predetermined opening-movement path, and in which closure-clearing position the stop member is out of the opening-movement path of the stop-engageable portion of the closure, the improvement comprising latch means interengageable between the stop member and the mount for securing the stop member in its closure-blocking position and including a latch groove and a latch projection located for locking interengagement when the stop member is in closure-blocking position, and spring means urging the stop member to move relative to the mount in the direction to disengage said latch groove and said latch projection.

5. The stop mechanism defined in claim 4, in which the spring means includes a helical compression spring engaged between the mount and the stop member and arranged concentrically with the stop member turning axis.

6. The stop mechanism defined in claim 4, and cam means turnable relative to the mount and the stop member for effecting movement of the stop member axially relative to the mount in opposition to the force of the spring means to engage the latch projection in the latch groove.

7. The stop mechanism defined in claim 1, in which the closure is mounted in a frame, and the mount is mounted on the closure frame so that the stop member turning axis is located farther from the face of the frame than it is to the closure when the closure is in its position closest to the stop member turning axis.

8. The stop mechanism defined in claim 2, and cam means turnable relative to the mount and the stop member for effecting movement of the stop member axially relative to the mount to engage the latch projection in the latch groove.

9. The stop mechanism defined in claim 8, in which the cam means include coacting edgewise cams relatively rotatable about the stop member turning axis.

10. The stop mechanism defined in claim 9, in which at least one of the edgewise cams is crowned and the cams are relatively turnable in one direction to move the crown beyond a predetermined position to deter relative turning of the cams in the opposite direction.

11. The stop mechanism defined in claim 2, and spring means urging the stop member to move relative to the mount in the direction to disengage the latch groove and the latch projection.

12. The stop mechanism defined in claim 11, in which the spring means includes a helical compression spring engaged between the mount and the stop member and arranged concentrically with the stop member turning axis.

13. The stop mechanism defined in claim 2, and shackle means for holding the stop member in position with the latch groove and latch projection engaged.

14. The stop mechanism defined in claim 1, in which the mount includes a lock strike.

* * * * *

UNITED STATES PATENT AND TRADEMARK OFFICE

CERTIFICATE OF CORRECTION

PATENT NO. : Re. 29,162

DATED : March 29, 1977

INVENTOR(S) : Lyall A. McLennan

It is certified that error appears in the above-identified patent and that said Letters Patent are hereby corrected as shown below:

Column 3, line 38, before "axis" insert --stop member turning--; line 39, cancel "stop member turning".

Signed and Sealed this

*Eighth* Day of *July 1980*

[SEAL]

*Attest:*

SIDNEY A. DIAMOND

*Attesting Officer*

*Commissioner of Patents and Trademarks*